US009331446B2

(12) United States Patent
Bluemmel et al.

(10) Patent No.: US 9,331,446 B2
(45) Date of Patent: May 3, 2016

(54) CRIMP TOOLING FOR A TERMINAL CRIMPING MACHINE

(71) Applicants: Tyco Electronics Corporation, Berwyn, PA (US); Tyco Electronics AMP GmbH, Bensheim (DE)

(72) Inventors: Uwe Bluemmel, Hemsbach (DE); Michael Morris, Harrisburg, PA (US); David Alan College, Annville, PA (US)

(73) Assignees: TE Connectivity Germany GmbH, Bensheim (DE); Tyco Electronics Corporation, Berwyn, PA (US)

( * ) Notice: Subject to any disclaimer, the term of this patent is extended or adjusted under 35 U.S.C. 154(b) by 151 days.

(21) Appl. No.: 14/031,728

(22) Filed: Sep. 19, 2013

(65) Prior Publication Data

US 2015/0074990 A1 Mar. 19, 2015

(51) Int. Cl.

| | |
|---|---|
| ***B23P 19/00*** | (2006.01) |
| ***H01R 43/04*** | (2006.01) |
| ***H01R 43/048*** | (2006.01) |
| ***H01R 43/058*** | (2006.01) |
| *H01R 4/18* | (2006.01) |
| *H01R 4/62* | (2006.01) |

(52) U.S. Cl.

CPC ............ *H01R 43/048* (2013.01); *H01R 43/058* (2013.01); *H01R 4/185* (2013.01); *H01R 4/188* (2013.01); *H01R 4/62* (2013.01); *Y10T 29/53235* (2015.01)

(58) Field of Classification Search

CPC .......... H01R 4/70; H01R 43/048; H01R 4/18; H01R 43/005; H01R 43/055; Y10T 29/53235

USPC ........... 29/751–753, 566.3, 33 M; 72/21.3, 3, 72/31.11, 37

See application file for complete search history.

(56) References Cited

U.S. PATENT DOCUMENTS

| | | | | |
|---|---|---|---|---|
| 5,174,022 A * | 12/1992 | Phillips | ................ | H01R 43/055 29/753 |
| 5,357,669 A * | 10/1994 | Orphanos | ............ | H01R 43/055 29/566.3 |
| 6,073,471 A * | 6/2000 | Naka | ..................... | B25B 27/146 29/715 |
| 2004/0007041 A1* | 1/2004 | Imgrut | ............... | H01R 43/0486 72/412 |

(Continued)

FOREIGN PATENT DOCUMENTS

| | | |
|---|---|---|
| AT | 189252 B | 3/1957 |
| DE | 10 2006 045 567 A1 | 4/2008 |

(Continued)

OTHER PUBLICATIONS

International Search Report, International Application No. PCT/US2014/054028, International Filing Date Sep. 4, 2014.

*Primary Examiner* — Minh Trinh

(57) ABSTRACT

Crimp tooling for crimping a crimp barrel of an electrical terminal to a wire includes an insulation crimper having an insulation crimp profile for crimping an insulation barrel segment of the crimp barrel to insulation of the wire, a wire crimper having a wire crimp profile for crimping a wire barrel segment of the crimp barrel to a conductor of the wire, and a transition crimper between the wire crimper and the insulation crimper. The transition crimper has a blended profile segueing from the wire crimp profile to the insulation crimp profile. The blended profile is used for crimping a transition segment of the crimp barrel between the insulation barrel segment and the wire barrel segment.

20 Claims, 6 Drawing Sheets

(56) References Cited

U.S. PATENT DOCUMENTS

2004/0007042 A1* 1/2004 Imgrut ................. H01R 43/055
72/412
2005/0034505 A1* 2/2005 Imai ................... H01R 43/0488
72/481.1
2005/0050940 A1* 3/2005 Ishizuka ............ H01R 42/0488
72/841.1
2010/0212147 A1* 8/2010 Malstrom ............ H01R 43/058
29/753
2013/0252481 A1 9/2013 Sato et al.

FOREIGN PATENT DOCUMENTS

JP 2009 087846 A 4/2009
WO 2012/054072 A1 4/2012
WO 2012/081552 A1 6/2012

* cited by examiner

CRIMP TOOLING FOR A TERMINAL CRIMPING MACHINE

BACKGROUND OF THE INVENTION

The subject matter described and/or illustrated herein relates generally to crimp tooling for a terminal crimping machine.

Electrical terminals are often used to terminate to the ends of wires. Such electrical terminals typically include an electrical contact and a crimp barrel. The crimp barrel includes an opening that receives an end of the wire therein. The crimp barrel is crimped around the end of the wire to establish an electrical connection between the one or more conductors of the wire and the terminal as well as to mechanically hold the electrical terminal on the wire end. When crimped over the wire end, the crimp barrel establishes an electrical connection between the conductor(s) of the wire and the electrical contact.

Conductors of wires are often fabricated from copper. However, as the cost of copper has risen, aluminum has been considered as an alternative conductor material. However, aluminum is not without disadvantages. For example, one disadvantage of using aluminum as a conductor material is an oxide layer that may build on the exterior surface of the conductor. Such an oxide layer has relatively poor electrical conductivity. Accordingly, the oxide layer must be penetrated to the base material to establish a reliable electrical connection between the conductor and the electrical terminal.

Another disadvantage of aluminum is electrochemical corrosion. Many electrical terminals are used within environments that may expose the terminal and the wire crimped thereto to moisture. For example, electrical terminals are often used within automobiles and other vehicles that operate in salt-aqueous environments. Exposure of a conductor to moisture may cause the conductor to corrode. For example, moisture that infiltrates a crimp interface between a conductor and a crimp barrel may cause the conductor to experience electrochemical corrosion, and thereby begin to dissolve. Moreover, the end of many conductors is exposed at an end of the crimp barrel of the electrical terminal, for example through an opening within the end of the crimp barrel and/or because the end of the conductor extends past the end of the crimp barrel. Such exposed ends of conductors may experience corrosion from exposure to moisture within the operating environment of the electrical terminal. Corrosion is thus an issue when using aluminum as a conductor material. Moreover, the electrical terminal is optionally fabricated from copper based alloyed materials. In the electrochemical series, copper and aluminum have a large difference in electrochemical potential, which indicates a high driving force for a corrosive reaction. Under hostile environments the corrosion rate could be rapid. Corrosion may therefore be especially problematic when terminating aluminum conductors to copper-based electrical terminals. A known attempt at prohibiting electrochemical corrosion includes preventing or reducing the exposure of a conductor to moisture. For example, attempts have been made to seal the wire using the crimp barrel, which extends the full length of the exposed conductors and forms a seal at the end of the wire. However, crimping such wire barrels is difficult and may require special tooling.

BRIEF DESCRIPTION OF THE INVENTION

In one embodiment, crimp tooling for crimping a crimp barrel of an electrical terminal to a wire includes an insulation crimper having an insulation crimp profile for crimping an insulation barrel segment of the crimp barrel to insulation of the wire, a wire crimper having a wire crimp profile for crimping a wire barrel segment of the crimp barrel to a conductor of the wire, and a transition crimper between the wire crimper and the insulation crimper. The transition crimper has a blended profile segueing from the wire crimp profile to the insulation crimp profile. The blended profile is used for crimping a transition segment of the crimp barrel between the insulation barrel segment and the wire barrel segment.

Optionally, the insulation crimp profile, blended profile and wire crimp profile define a continuous crimping profile for the crimp barrel. The blended profile has a smooth transition to the insulation crimp profile and has a smooth transition to the wire crimp profile. Optionally, the transition crimper is formed integral with at least one of the insulation crimper and the wire crimper.

Optionally, the insulation crimper may include opposed lead-in sections for forming side walls of the insulation barrel segment and may include crimp radius sections for forming a top of the insulation barrel segment. The lead-in sections may be separated by a first width and the crimp radius sections may have a first radius of curvature. Optionally, the wire crimper may include opposed lead-in sections for forming side walls of the wire barrel segment and may include crimp radius sections for forming a top of the wire barrel segment. The lead-in sections of the wire crimper may be separated by a second width narrower than the first width. The crimp radius sections of the wire crimper may have a second radius of curvature less than the first radius of curvature.

Optionally, the blended profile of the transition crimper may transition between the lead-in sections of the insulation crimper and wire crimper and may transition between the crimp radius sections of the insulation crimper and wire crimper. The transition crimper may include opposed lead-in sections for forming side walls of the transition segment of the crimp barrel and may include crimp radius sections for forming a top of the transition segment of the crimp barrel. The lead-in sections of the transition crimper may transition between the lead-in sections of the insulation crimper and wire crimper. The crimp radius sections of the transition crimper may transition between the crimp radius sections of the insulation crimper and wire crimper. Optionally, a width between the lead-in sections of the transition crimper may constantly change along the lead-in sections. Radii of the crimp radius sections of the transition crimper may change along the crimp radius sections, such as between a front and a rear thereof. Optionally, the terminal crimper may have a front and a rear. The front may be provided at the wire crimper. The rear may be provided at the insulation crimper. The lead-in sections of the transition crimper may widen from the front to the rear. The radii of the crimp radius sections of the transition crimper may increase from the front to the rear.

Optionally, the insulation crimper may form an F-crimp on the insulation barrel segment. The wire crimper may form an F-crimp on the wire barrel segment. The transition crimper may form an F-crimp on the transition segment of the crimp barrel.

Optionally, the insulation crimper may include a receiving space bounded by the insulation crimp profile that receives the insulation barrel segment of the crimp barrel. The wire crimper may include a receiving space bounded by the wire crimp profile that receives the wire barrel segment of the crimp barrel. The transition crimper may include a receiving space bounded by the blended profile that receives the transition segment of the crimp barrel. A volume of the receiving space of the insulation crimper may be generally constant from a front to a rear of the insulation crimper. A volume of the receiving space of the wire crimper may be generally constant from a front to a rear of the wire crimper. A volume of the receiving space of the transition crimper may generally increases from a front to a rear of the transition crimper.

DETAILED DESCRIPTION OF THE INVENTION

Figure 1:
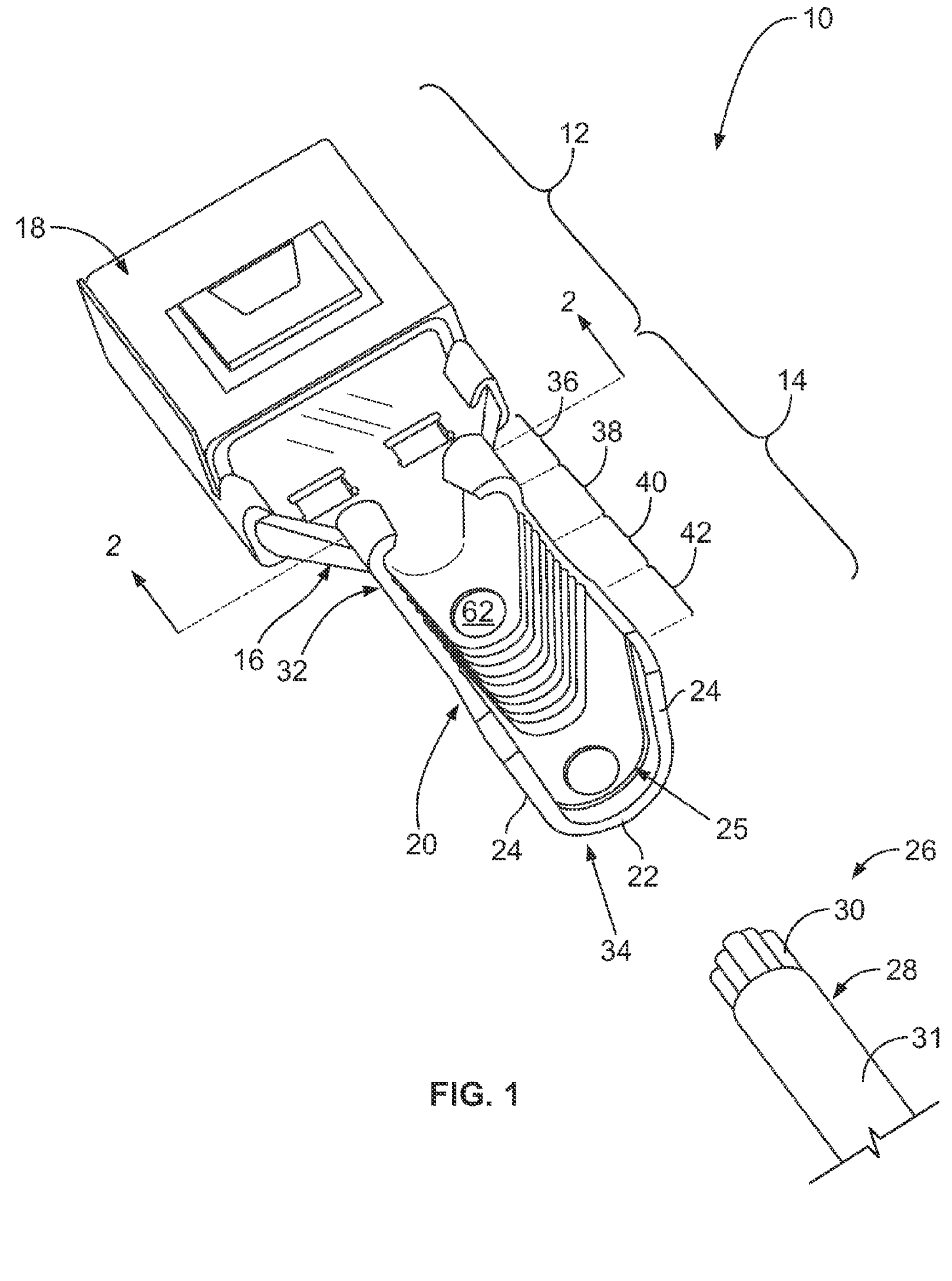
FIG. 1 is a perspective view of an exemplary embodiment of an electrical terminal.

FIG. 1 is a perspective view of an exemplary embodiment of an electrical terminal 10. The terminal 10 includes an electrical contact segment 12 and a crimp segment 14 that extends from an end 16 of the electrical contact segment 12. The electrical contact segment 12 includes an electrical contact 18. In the exemplary embodiment, the electrical contact 18 is a receptacle that is configured to receive a mating contact (not shown) therein, however any type of electrical contact may be used in alternative embodiments, such as, but not limited to, a barrel, a socket, a spring contact, a beam contact, a tab, a structure having an opening for receiving a threaded or other type of mechanical fastener, and/or the like.

The crimp segment 14 includes a crimp barrel 20. The crimp barrel 20 includes a base 22 and opposing side walls 24 that extend from the base 22. The base 22 and the side walls 24 define an opening 25 of the crimp barrel 20 that is configured to receive an end 26 of a wire 28. The crimp barrel 20 is configured to be crimped around the end 26 of the wire 28 to mechanically and electrically connect the wire 28 to the electrical terminal 10. The wire 28 includes conductors 30, which may be any type of conductors. Optionally, the conductors 30 are fabricated from (e.g., may include) aluminum. Additionally or alternatively, the conductors 30 may be fabricated from any other electrically conductive materials, such as, but not limited to, copper and/or the like. Optionally, the wire 28 includes electrical insulation 31 extending around the conductors 30 along at least a portion of the length of the conductors 30. The electrical insulation 31 may be a jacket of the wire 28.

The crimp barrel 20 extends a length from a contact end 32 to a wire end 34. The contact end 32 extends from the electrical contact 18. More particularly, the contact end 32 extends from the end 16 of the electrical contact segment 12. The wire end 34 is configured to be crimped to the exposed conductors 30 at the end of the wire 28 as well as to the insulation 31. The crimp barrel 20 includes a front seal segment 36, a wire barrel segment 38, a transition segment 40, and an insulation barrel segment 42. The front seal segment 36 provides a seal at the contact end 32 of the crimp barrel 20. The wire barrel segment 38 engages the conductors 30 to electrically connect the crimp barrel 20 to the conductors 30. The insulation barrel segment 42 provides a rear seal to the insulation 31 and provides strength to the connection of the crimp barrel 20 to the wire 28. A sealant such as, but not limited to, a grease, a lacquer, a gel, a fat, and/or the like, may optionally provided within the opening 25 of the crimp barrel 20 before the crimp barrel 20 is crimped around the wire 28 to provide additional sealing for the conductors 30. When the conductors 30 are aluminum, the sealing provided by the crimp barrel 20, such as by the front seal segment 36, the rear seal by the insulation barrel segment 42 and the sealing provided along the conductors 30 by the wire barrel segment 38 and transition segment 40, may reduce oxidation and/or corrosion of the conductors 30.

Figure 2:
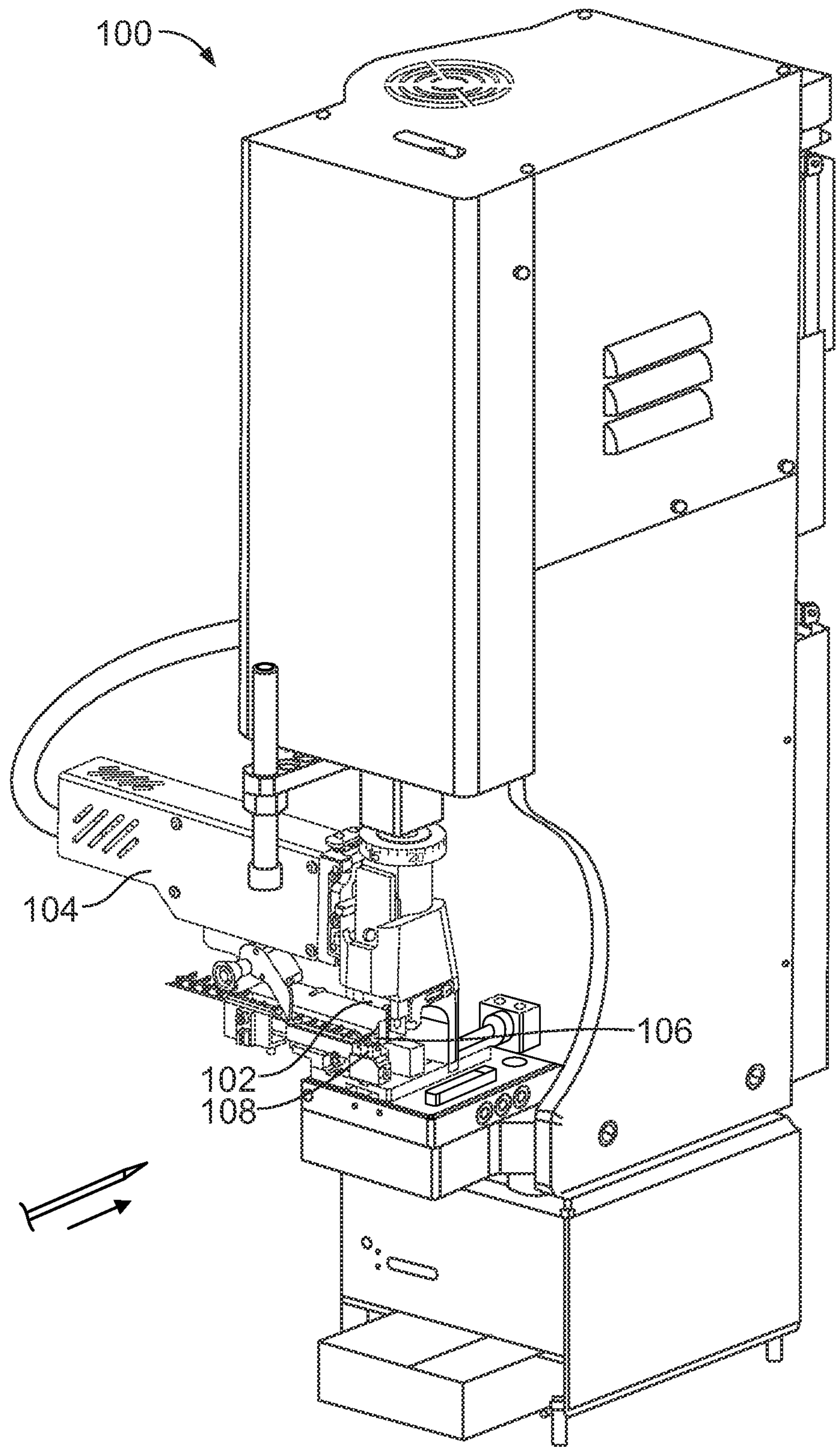
FIG. 2 is a perspective view of an exemplary embodiment of a terminal crimping machine formed in accordance with an exemplary embodiment that may be used to crimp the terminal shown in FIG. 1 to a wire.

FIG. 2 is a perspective view of an exemplary embodiment of a terminal crimping machine 100 that may be used to crimp the terminal 10 to the wire 28 (both shown in FIG. 1). The terminal crimping machine 100 may be any type of terminal crimping machine, such as an applicator, terminator, press, lead maker, bench machine, hand tool or other type of crimping machine, that includes crimp tooling 102. In the illustrated embodiment, the terminal crimping machine 100 includes a feeder 104 for feeding the terminals 10 to the crimping zone for crimping to the wire 28. In the illustrated embodiment, the feeder 104 is an electrically actuated feeder 104, however other types of feeders 104, such as pneumatic feeders, cam and linkage feeders, and the like, may be used depending on the type of terminal crimping machine.

The terminal crimping machine 100 has a terminating zone or crimping zone 106 that receives the terminal 10 and the wire 28. The feeder 104 is positioned to feed the terminals 10 to the crimping zone 106 for crimping by the crimp tooling 102. During operation, the crimp tooling 102 is driven through a crimp stroke by a driving mechanism of the terminal crimping machine 100 toward a stationary anvil 108. The driving mechanism may be a ram or other mechanical component cyclically driven through the crimp stroke. The crimp stroke has both an advancing or downward component and a return or upward component. The crimp tooling 102 is advanced downward toward the anvil 108 to a seated position and is returned upward to a released position.

Figure 3:
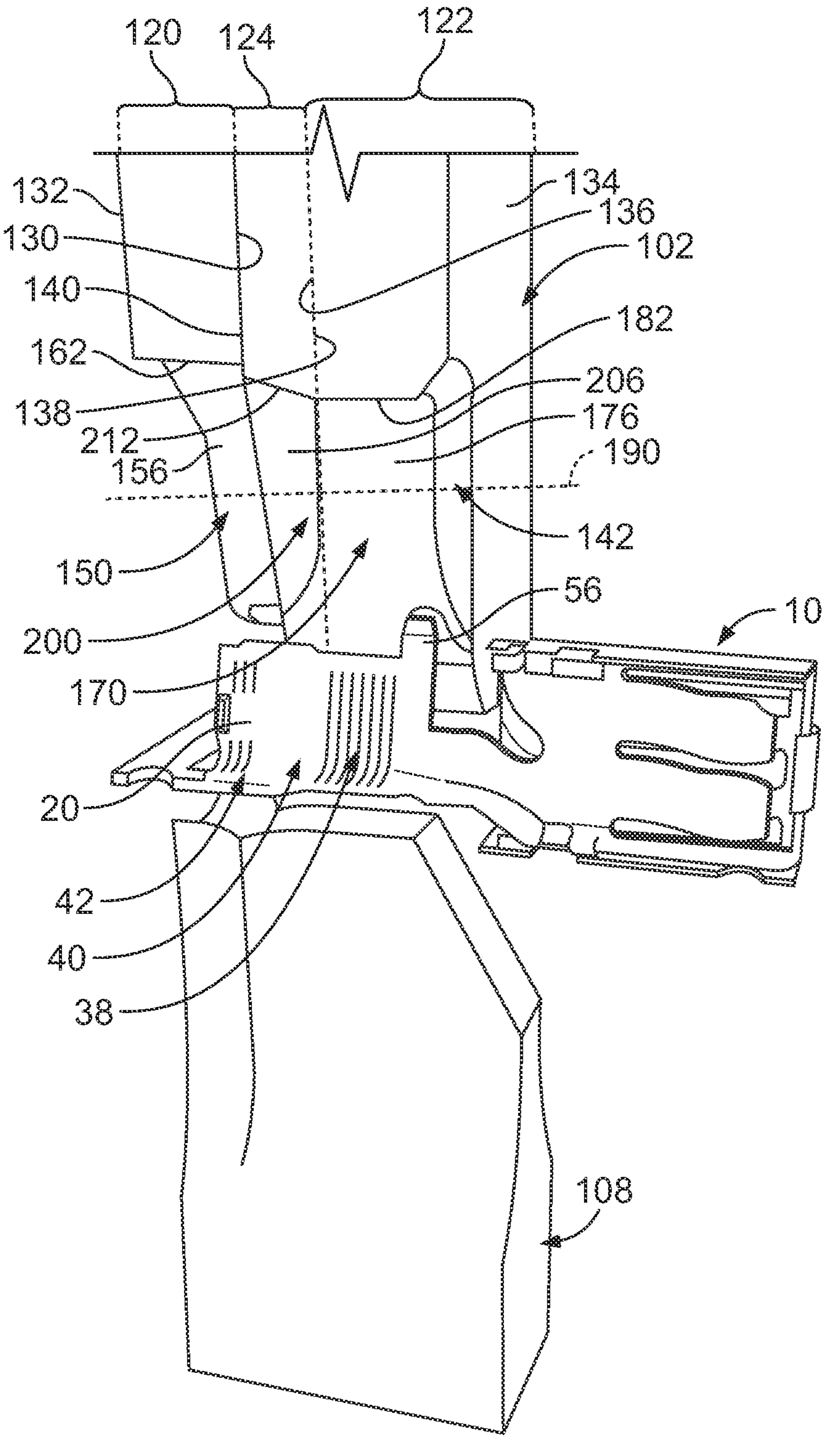
FIG. 3 is a partial sectional view of crimp tooling for the terminal crimping machine and formed in accordance with an exemplary embodiment.

FIG. 3 is a partial sectional view of the crimp tooling 102 positioned with respect to the anvil 108 with the terminal 10 positioned in the crimping zone 106. The crimp tooling 102 is configured to be driven during a crimping operation toward the crimp barrel 20 to terminate the crimp barrel 20 to the wire 28 (shown in FIG. 1). The crimp tooling 102 includes an insulation crimper 120, a wire crimper 122 and a transition crimper 124 between the insulation crimper 120 and the wire crimper 122.

The insulation crimper 120 is used to crimp the insulation barrel segment 42 of the crimp barrel 20 to the insulation 31 (shown in FIG. 1) of the wire 28. The wire crimper 122 is used to crimp the wire barrel segment 38 of the crimp barrel 20 to the conductors 30 (shown in FIG. 1) of the wire 28. The transition crimper 124 is used to crimp the transition segment 40 of the crimp barrel 20. In an exemplary embodiment, because the conductors 30 have a smaller diameter than the electrical insulation 31, the wire barrel segment 38 is dimensioned differently than the insulation barrel segment 42 to accommodate for the conductors 30 and insulation 31, respectively. The transition segment 40 transitions between the wire barrel segment 38 and the insulation barrel segment 42.

The insulation crimper 120, wire crimper 122 and transition crimper 124 are shaped to accommodate the insulation barrel segment 42, wire barrel segment 38 and transition segment 40, respectively. In an exemplary embodiment, the transitions crimper 124 segues from the wire crimper 122 to the insulation crimper 120. The transition crimper 124 may define a smooth transition between the wire crimper 122 and the insulation crimper 120. The insulation crimper 120, wire crimper 122 and transition crimper 124 are continuous or closed along the entire length of the crimp (e.g. along the insulation barrel segment 42, wire barrel segment 38 and transition segment 40).

In an exemplary embodiment, the crimped tooling 102 comprises multiple pieces that are coupled or fasten together. For example, in the illustrated embodiment, the wire crimper 122 and transition crimper 124 are integrally formed together as a common piece. The insulation crimper 120 is a separate piece coupled to the wire crimper 122 and transition crimper 124. Alternatively, the transition crimper 124 may be integrally formed with the insulation crimper 120 as opposed to the wire crimper 122. In other alternative embodiments, the transition crimper 124 may be a separate piece from the insulation crimper 120 and wire crimper 122.

The insulation crimper 120 extends between a front 130 and a rear 132. The wire crimper 122 extends between a front 134 and a rear 136. The transition crimper 124 extends between a front 138 and a rear 140. The wire crimper 122 is positioned forward of the transition crimper 124 and insulation crimper 120. The front 138 of the transition crimper 124 is provided at the rear 136 of the wire crimper 122. The rear 140 of the transition crimper 124 is provided at the front 130 of the insulation crimper 120. The insulation crimper 120 may be tightly held against the transition crimper 124 such that the front 130 abuts against the rear 140 of the transition crimper 124. In an exemplary embodiment, the wire crimper 122 includes a bell mouth 142 at the front 134. The bell mouth 142 transitions outward as a lead in to the wire crimper 122.

Figure 4:
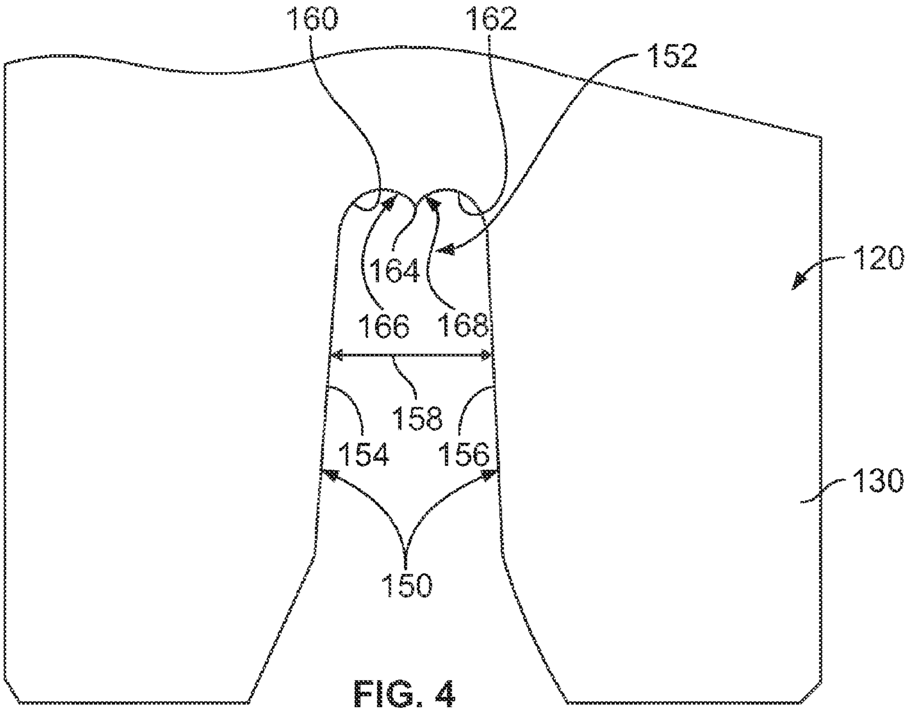
FIG. 4 is a rear view of an insulation crimper portion of the crimp tooling.

FIG. 4 is a front view of the insulation crimper 120. The insulation crimper 120 has an insulation crimp profile 150 for crimping the insulation barrel segment 42 of the crimp barrel 20 (both shown in FIG. 1) to the insulation 31 of the wire 28 (both shown in FIG. 1). The insulation crimp profile 150 is defined by internal surfaces formed in the insulation crimper 120. The internal surfaces may be formed by an electric discharge machining (EDM) or a wire EDM process. The internal surfaces may be formed by other removal processes, such as milling or grinding or by 3D printing or forging of the insulation crimper 120.

The surfaces define a receiving space 152 bounded by the insulation crimp profile 150 that receives the insulation barrel segment 42 of the crimp barrel 20. The side walls 24 (shown in FIG. 1) of the insulation barrel segment 42 are formed against the insulation crimp profile 150 during the crimping process. The side walls 24 may be folded over during the crimping process. The insulation crimp profile 150 may be shaped to form an open barrel crimp, such as an F-crimp, along the insulation barrel segment 42. Optionally, a volume of the receiving space 152 may have a generally constant cross section from the front 130 to the rear 132 (shown in FIG. 3) of the insulation crimper 120.

The insulation crimper 120 includes opposed lead-in sections 154, 156 for forming the side walls 24 of the insulation barrel segment 42. The lead-in sections 154 are separated by a width 158, which may vary along the insulation crimp profile 150. For example, the width 158 may be narrower near a top of the lead-in sections 154, 156 and may be wider near a bottom of the lead-in sections 154, 156. Optionally, the width 158 may vary from the front 130 to the rear 132.

The insulation crimper 120 includes crimp radius sections 160, 162 that are used for forming a top of the insulation barrel segment 42. The crimp radius sections 160, 162 are generally curved, while the lead-in sections 154, 156 are generally flat (however may have a curvature, but less curvature than the crimp radius sections 160,1 62). The crimp radius section 160 transitions into the lead-in section 154. The crimp radius section 162 transitions into the lead-in section 156. In the illustrated embodiment, the crimp radius sections 160, 162 meet at a tip 164. The crimp radius sections 160, 162 are shaped to fold the side walls 24 inward into the insulation 31 during the crimping process. The crimp radius sections 160, 162 each have a corresponding radius of curvature 166, 168.

The radius of curvature 166 of the crimp radius section 160 may be constant from the lead-in section 154 to the tip 164, or alternatively may vary from the lead-in section 154 to the tip 164. For example, the radius of curvature 166 may be smaller near the top and larger near the lead-in section 154 and/or the tip 164. Optionally, the radius of curvature 166 of the crimp radius section 160 may vary from the front 130 to the rear 132 of the insulation crimper 120.

The radius of curvature 168 of the crimp radius section 162 may be constant from the lead-in section 156 to the tip 164, or alternatively may vary from the lead-in section 156 to the tip 164. For example, the radius of curvature 168 may be smaller near the top and larger near the lead-in section 156 and/or the tip 164. Optionally, the radius of curvature 168 of the crimp radius section 162 may vary from the front 130 to the rear 132 of the insulation crimper 120.

Figure 6:
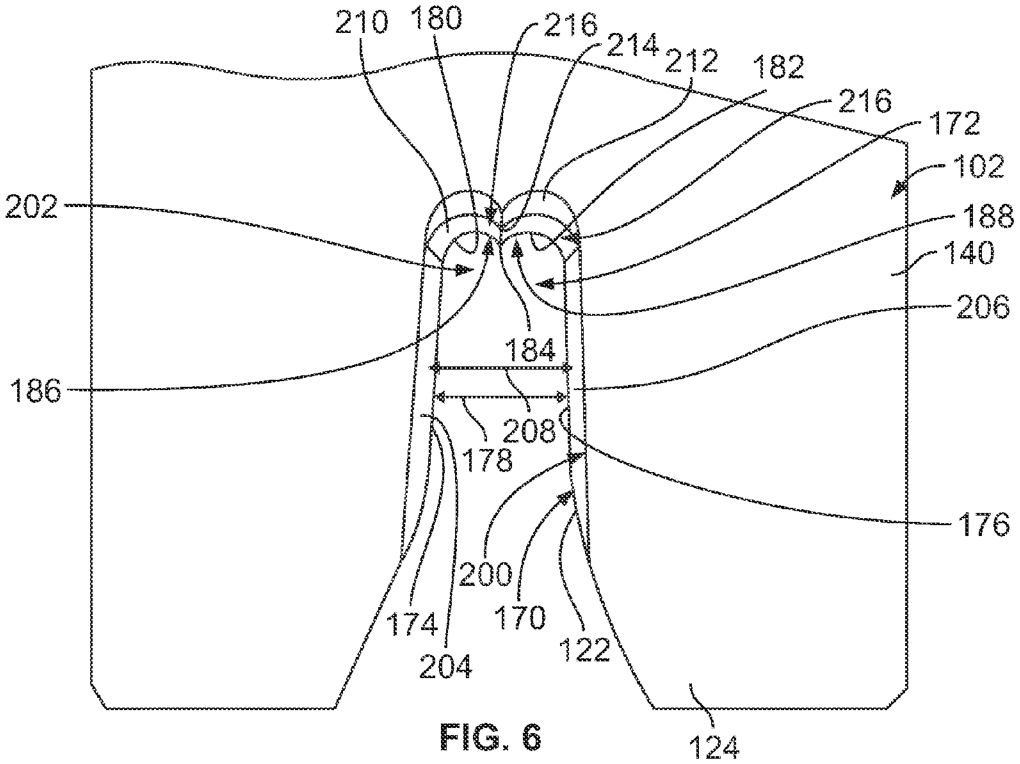
FIG. 6 is a rear view of a portion of the crimp tooling showing the wire crimper and the transition crimper.
Figure 5:
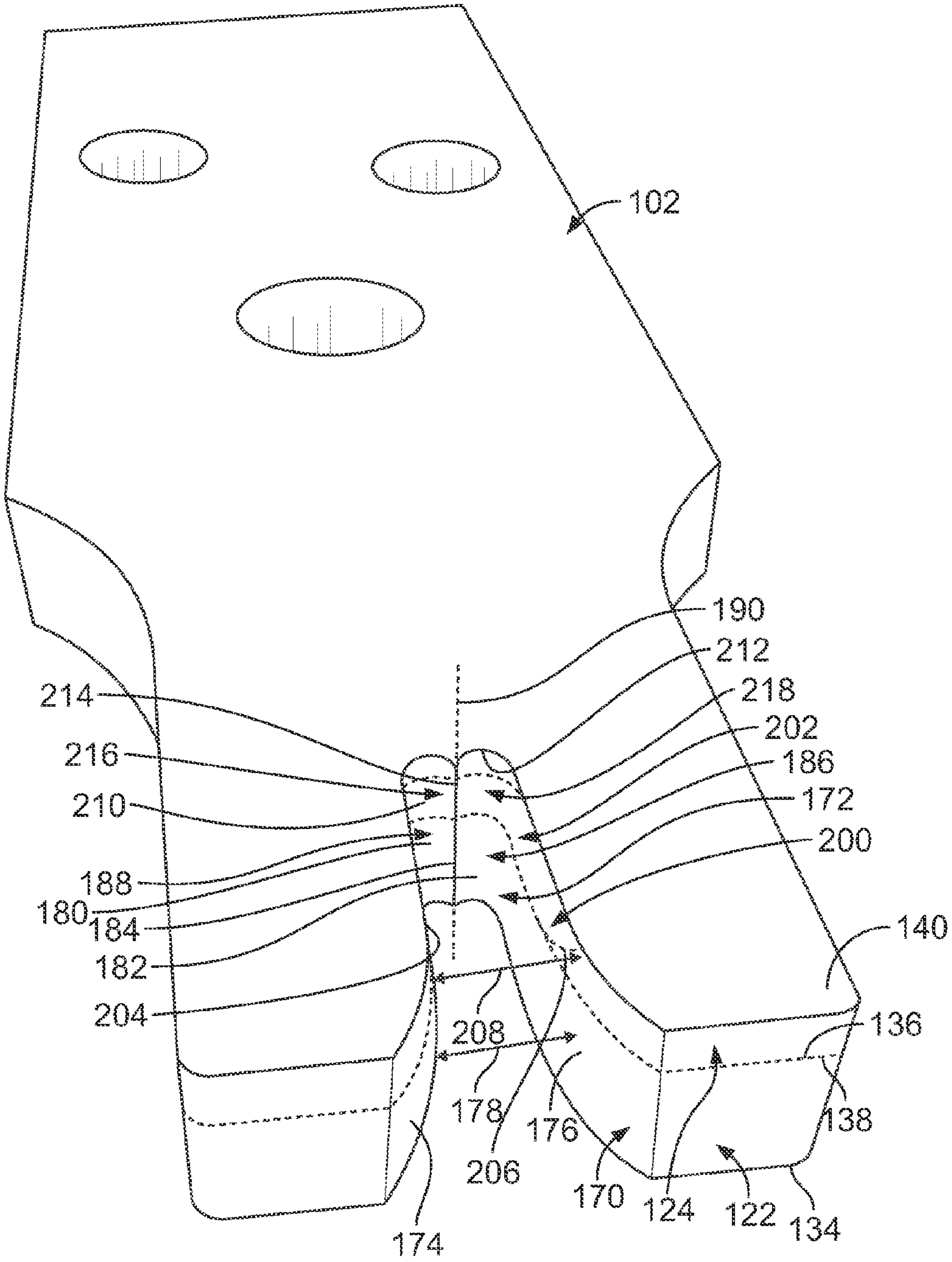
FIG. 5 is a rear perspective view of a portion of the crimp tooling showing a wire crimper and a transition crimper for the crimp tooling and formed in accordance with an exemplary embodiment.

FIG. 5 is a rear perspective view of a portion of the crimp tooling 102 showing the wire crimper 122 and transition crimper 124. FIG. 6 is a rear view of a portion of the crimp tooling 102 showing the wire crimper 122 and the transition crimper 124. In the illustrated embodiment, the wire crimper 122 and the transition crimper 124 are integrally formed as a one piece body. The transition crimper 124 transitions into the wire crimper 122.

The wire crimper 122 has a wire crimp profile 170 for crimping the wire barrel segment 38 of the crimp barrel 20 (both shown in FIG. 1) to the conductors 30 of the wire 28 (both shown in FIG. 1). The wire crimp profile 170 is defined by internal surfaces formed in the wire crimper 122. The internal surfaces may be formed by an EDM or a wire EDM process. The internal surfaces may be formed by other removal processes, such as milling or grinding or by 3D printing or forging of the wire crimper 122.

The surfaces define a receiving space 172 bounded by the wire crimp profile 170 that receives the wire barrel segment 38 of the crimp barrel 20. The side walls 24 (shown in FIG. 1) of the wire barrel segment 38 are formed against the wire crimp profile 170 during the crimping process. The side walls 24 may be folded over during the crimping process. The wire crimp profile 170 may be shaped to form an F-crimp along the wire barrel segment 38. Optionally, a volume of the receiving space 172 may have a generally constant cross section from the front 134 to the rear 136 of the wire crimper 122.

The wire crimper 122 includes opposed lead-in sections 174, 176 for forming the side walls 24 of the wire barrel segment 38. The lead-in sections 174 are separated by a width 178, which may vary along the wire crimp profile 170. For example, the width 178 may be narrower near a top of the lead-in sections 174, 176 and may be wider near a bottom of the lead-in sections 174, 176. Optionally, the width 178 may vary from the front 134 to the rear 136. The second width 178 may be narrower than the first width 158 (shown in FIG. 4) of the insulation crimper 120 (shown in FIG. 4).

The wire crimper 122 includes crimp radius sections 180, 182 that are used for forming a top of the wire barrel segment 38. The crimp radius section 180 transitions into the lead-in section 174. The crimp radius section 182 transitions into the lead-in section 176. In the illustrated embodiment, the crimp radius sections 180, 182 meet at a tip 184. The crimp radius sections 180, 182 are shaped to fold the side walls 24 inward into the conductors 30 during the crimping process. The crimp radius sections 180, 182 each have a corresponding radius of curvature 186, 188.

The radius of curvature 186 of the crimp radius section 180 may be constant from the lead-in section 174 to the tip 184, or alternatively may vary from the lead-in section 174 to the tip 184. For example, the radius of curvature 186 may be smaller near the top and larger near the lead-in section 174 and/or the tip 184. Optionally, the radius of curvature 186 of the crimp radius section 180 may vary from the front 134 to the rear 136 of the wire crimper 122.

The radius of curvature 188 of the crimp radius section 182 may be constant from the lead-in section 176 to the tip 184, or alternatively may vary from the lead-in section 176 to the tip 184. For example, the radius of curvature 188 may be smaller near the top and larger near the lead-in section 176 and/or the tip 184. Optionally, the radius of curvature 188 of the crimp radius section 182 may vary from the front 134 to the rear 136 of the wire crimper 122.

The transition crimper 124 is axially offset rearward of the wire crimper 122 along a longitudinal axis 190. The insulation crimper 120 is configured to be coupled to the transition crimper 124 such that the insulation crimper 120 is axially offset rearward of the transition crimper 124 along the longitudinal axis 190.

The transition crimper 124 has a blended profile 200 for crimping the transition segment 40 of the crimp barrel 20 (both shown in FIG. 1) to the wire 28 (shown in FIG. 1). The blended profile 200 segues into the wire crimp profile 170 and transitions into the insulation crimp profile 150 (shown in FIG. 4). The blended profile 200 is defined by internal surfaces formed in the transition crimper 124. The internal surfaces may be formed by an EDM or a wire EDM process. The internal surfaces may be formed by other removal processes, such as milling or grinding or by 3D printing or forging of the transition crimper 124. The internal surfaces segue into the internal surfaces of the wire crimper 122 to define a smooth transition between the blended profile 200 and the wire crimp profile 170.

The surfaces define a receiving space 202 bounded by the blended profile 200 that receives the transition segment 40 of the crimp barrel 20. The receiving space 202 is open to the receiving space 172 of the wire crimper 122. The side walls 24 of the transition segment 40 are formed against the blended profile 200 during the crimping process. The side walls 24 may be folded over during the crimping process. The blended profile 200 may be shaped to form an F-crimp along the transition segment 40. Optionally, a volume of the receiving space 202 may generally increase from the front 138 to the rear 140 of the transition crimper 124.

The transition crimper 124 includes opposed lead-in sections 204, 206 for forming the side walls 24 of the transition segment 40. The lead-in sections 204 are separated by a width 208 that varies along the blended profile 200. For example, the width 208 is narrower near a top of the lead-in sections 204, 206 and is wider near a bottom of the lead-in sections 204, 206. The width 208 also varies from the front 138 to the rear 140 to transition from the lead-in sections 174, 176 of the wire crimper 122 to the lead-in sections 154, 156 (both shown in FIG. 4) of the insulation crimper 120. Because the width 158 (shown in FIG. 4) of the insulation crimper 120 is wider than the width 178 of the wire crimper 122 to accommodate the larger diameter insulation 31 as compared to the smaller diameter conductors 30, the width 208 of the transition crimper 124 varies from the front 138 to the rear 140. The transition crimper 124 defines a smooth continuous transition from the lead-in section 174 to the lead-in section 154 and from the lead-in section 176 to the lead-in section 156.

The transition crimper 124 includes crimp radius sections 210, 212 that are used for forming a top of the transition segment 40. The crimp radius section 210 transitions into the lead-in section 204. The crimp radius section 212 transitions into the lead-in section 206. In the illustrated embodiment, the crimp radius sections 210, 212 meet at a tip 214. The crimp radius sections 210, 212 are shaped to fold the side walls 24 inward into the wire 28 during the crimping process. The crimp radius sections 210, 212 each have a corresponding radius of curvature 216, 218.

The radius of curvature 216 of the crimp radius section 210 may be constant from the lead-in section 204 to the tip 214 at any given cross-section taken along the longitudinal axis 190. Alternatively, the radius of curvature 216 of the crimp radius section 210 may vary from the lead-in section 204 to the tip 214 at any given cross-section taken along the longitudinal axis 190. For example, the radius of curvature 216 may be smaller near the top and larger near the lead-in section 204 and/or the tip 214.

In an exemplary embodiment, the radius of curvature 216 of the crimp radius section 210 varies from the front 138 to the rear 140 of the transition crimper 124 to transition from the crimp radius section 180 of the wire crimper 122 to the crimp radius section 160 (shown in FIG. 4) of the insulation crimper 120. Because the radius of curvature 166 (shown in FIG. 4) of the insulation crimper 120 is greater than the radius of curvature 186 of the wire crimper 122 to accommodate the larger diameter insulation 31 as compared to the smaller diameter conductors 30, the radius of curvature 216 of the transition crimper 124 varies from the front 138 to the rear 140. The transition crimper 124 defines a smooth continuous transition from the crimp radius section 160 to the crimp radius section 180.

The radius of curvature 218 of the crimp radius section 212 may be constant from the lead-in section 206 to the tip 214 at any given cross-section taken along the longitudinal axis 190. Alternatively, the radius of curvature 218 of the crimp radius section 212 may vary from the lead-in section 206 to the tip 214 at any given cross-section taken along the longitudinal axis 190. For example, the radius of curvature 218 may be smaller near the top and larger near the lead-in section 206 and/or the tip 214.

In an exemplary embodiment, the radius of curvature 218 of the crimp radius section 212 varies from the front 138 to the rear 140 of the transition crimper 124 to transition from the crimp radius section 182 of the wire crimper 122 to the crimp radius section 162 (shown in FIG. 4) of the insulation crimper 120. Because the radius of curvature 168 (shown in FIG. 4) of the insulation crimper 120 is greater than the radius of curvature 188 of the wire crimper 122 to accommodate the larger diameter insulation 31 as compared to the smaller diameter conductors 30, the radius of curvature 218 of the transition crimper 124 varies from the front 138 to the rear 140. The transition crimper 124 defines a smooth continuous transition from the crimp radius section 162 to the crimp radius section 182.

Returning to FIG. 3, the arrangement of the insulation crimper 120, wire crimper 122 and transition crimper 124 are illustrated. FIG. 3 shows how the insulation crimp profile 150, blended profile 200 and wire crimp profile 170 define a continuous crimping profile for the crimp barrel 20. The blended profile 200 has a smooth transition to the insulation crimp profile 150 axially along the longitudinal axis 190 and has a smooth transition to the wire crimp profile 170 axially along the longitudinal axis 190. Optionally, the blended profile 200 of the transition crimper 124 transitions between the lead-in sections 156, 176 of the insulation crimper 120 and wire crimper 122 and transitions between the crimp radius sections 162, 182 of the insulation crimper 120 and wire crimper 122. For example, the lead-in section 204 of the transition crimper 124 transition between the lead-in sections 156, 176 of the insulation crimper 120 and wire crimper 122 and the crimp radius section 212 of the transition crimper 124 transition between the crimp radius sections 162, 182 of the insulation crimper 120 and wire crimper 122.

Figure 7:
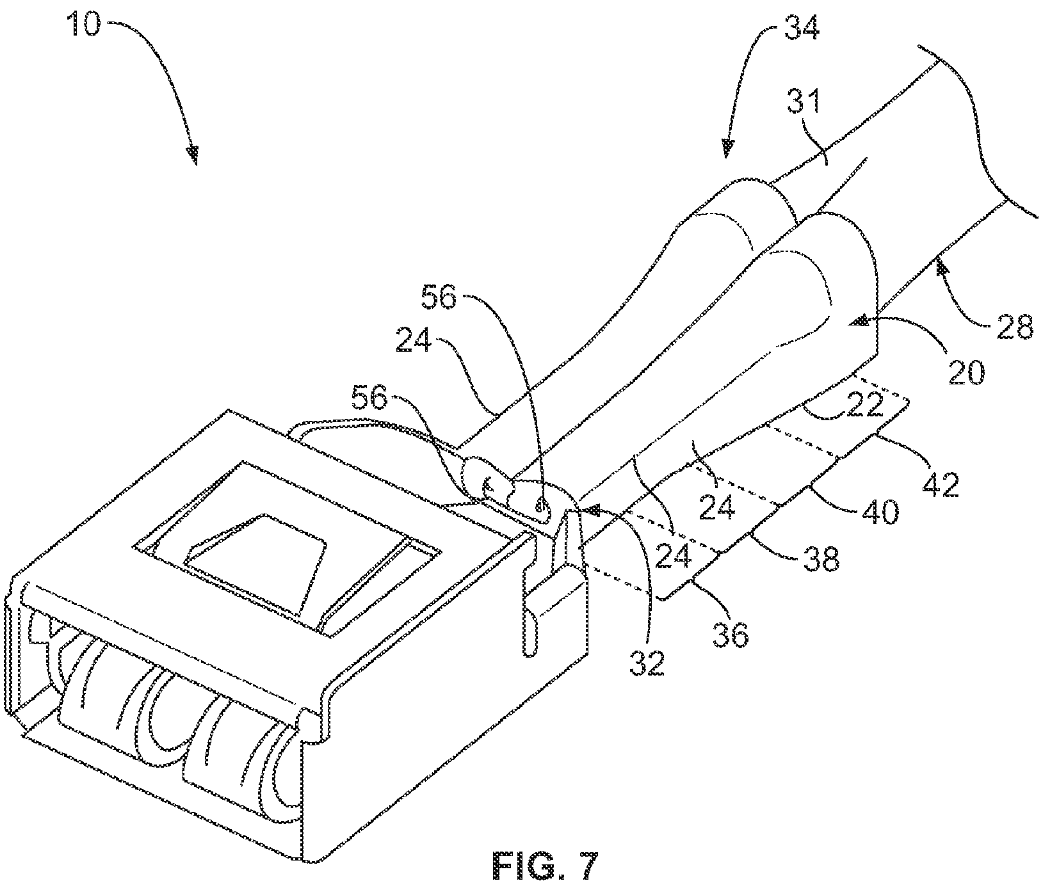
FIG. 7 is a perspective view of the electrical terminal illustrating the electrical terminal after a crimp barrel thereof has been crimped around the wire.

FIG. 7 is a perspective view of the electrical terminal 10 illustrating the electrical terminal 10 after the crimp barrel 20 has been crimped around the wire 28. As can be seen in FIG. 7, the side walls 24 have been crimped over the wire 28 such that the side walls 24 are folded over. The crimp barrel 20 is crimped along segments 36, 38, 40, and 42 such that, when crimped, a seal is formed along the length of the crimp barrel 20. The crimp barrel 20 is continuous from the contact end 32 to the wire end 34. The transition segment 40 transitions between the insulation barrel segment 42 and the wire barrel segment 38, even though such segments 42, 38 have different diameters. The transition segment 40 forms a smooth, continuous crimp barrel 20 that completely encloses the end of the wire 28.

Optionally, no portion of the conductor(s) 30 (shown in FIG. 1) extends past the contact end 32 of the crimp barrel 20 after the crimp barrel 20 has been crimped around the wire 28. The sealing provided by sealing wings 56 at the front seal segment 36 and/or sealant facilitates preventing moisture from contacting the conductor(s) 30 as compared to terminals wherein a conductor end sticks out past the contact end of a crimp barrel and/or terminals wherein a conductor is exposed through an opening within the contact end of a crimp barrel. Such an arrangement works well with aluminum conductors 30, as corrosion and oxidation is reduced or eliminated by the sealing arrangement of the crimp barrel 20, without the need for additional seals or ferrules that extend around the entire crimp barrel 20 and wire end. When the crimp barrel 20 has been crimped around the wire 28, the side walls 24 and the base 22 of the crimp barrel 20 define a continuous enclosure that extends entirely around the circumference of the wire 28 from the electrical insulation 31 past the end of the conductors 30. In other words, the side walls 24 and the base 22 of the crimp barrel 20 define a continuous enclosure that extends entirely around the circumference of the wire 28 from the contact end 32 to the wire end 34 of the crimp barrel 20.

The embodiments described and/or illustrated herein provide an electrical terminal that may be less likely to experience electrochemical corrosion on one or more conductors of a wire terminated by the electrical terminal, on interior surfaces of the electrical terminal, at an interface between the conductor(s) of the wire and the interior surfaces of the electrical terminal, and/or the like. The embodiments described herein provide crimp tooling for forming a crimp barrel of such an electrical terminal onto a wire.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. Crimp tooling for crimping a crimp barrel of an electrical terminal to a wire, the crimp tooling comprising:
- an insulation crimper having an insulation crimp profile for crimping an insulation barrel segment of the crimp barrel to insulation of the wire;
- a wire crimper having a wire crimp profile for crimping a wire barrel segment of the crimp barrel to a conductor of the wire; and
- a transition crimper between the wire crimper and the insulation crimper, the transition crimper having a blended profile segueing without interruption from the wire crimp profile to the insulation crimp profile, the blended profile for crimping a transition segment of the crimp barrel around the wire that transitions without interruption between the insulation barrel segment and the wire barrel segment.

2. The crimp tooling of claim 1, wherein the insulation crimp profile, blended profile and wire crimp profile define a continuous crimping profile for the crimp barrel.

3. The crimp tooling of claim 1, wherein the blended profile has a smooth transition to the insulation crimp profile and has a smooth transition to the wire crimp profile.

4. The crimp tooling of claim 1, wherein the transition crimper is formed integral with at least one of the insulation crimper and the wire crimper.

5. The crimp tooling of claim 1, wherein the insulation crimper includes opposed lead-in sections for forming side walls of the insulation barrel segment and includes crimp radius sections for forming a top of the insulation barrel segment, the lead-in sections being separated by a first width, the crimp radius sections having a first radius of curvature, the wire crimper includes opposed lead-in sections for forming side walls of the wire barrel segment and includes crimp radius sections for forming a top of the wire barrel segment, the lead-in sections of the wire crimper being separated by a second width narrower than the first width, the crimp radius sections of the wire crimper having a second radius of curvature less than the first radius of curvature, the blended profile of the transition crimper transitions between the lead-in sections of the insulation crimper and wire crimper and transitions between the crimp radius sections of the insulation crimper and wire crimper.

6. The crimp tooling of claim 5, wherein the transition crimper includes opposed lead-in sections for forming side walls of the transition segment of the crimp barrel and includes crimp radius sections for forming a top of the transition segment of the crimp barrel, the lead-in sections of the transition crimper transitioning between the lead-in sections of the insulation crimper and the corresponding lead-in sections of the wire crimper, the crimp radius sections of the transition crimper transitioning between the crimp radius sections of the insulation crimper and the corresponding crimp radius sections of the wire crimper.

7. The crimp tooling of claim 6, wherein a width between the lead-in sections of the transition crimper constantly changes along the lead-in sections and wherein the radius of curvature of the crimp radius sections of the transition crimper constantly change along the crimp radius sections.

8. The crimp tooling of claim 6, wherein the transition crimper has a front and a rear, the front provided at the wire crimper, the rear provided at the insulation crimper, the lead-in sections of the transition crimper widening from the front to the rear, the radii of the crimp radius sections of the transition crimper increasing from the front to the rear.

9. The crimp tooling of claim 1, wherein the insulation crimper forms an F-crimp on the insulation barrel segment, the wire crimper forms an F-crimp on the wire barrel segment, and the transition crimper forms an F-crimp on the transition segment of the crimp barrel.

10. The crimp tooling of claim 1, wherein the insulation crimper comprises a receiving space bounded by the insulation crimp profile that receives the insulation barrel segment of the crimp barrel, wherein the wire crimper comprises a receiving space bounded by the wire crimp profile that receives the wire barrel segment of the crimp barrel, and wherein the transition crimper comprises a receiving space bounded by the blended profile that receives the transition segment of the crimp barrel.

11. The crimp tooling of claim 10, wherein a volume of the receiving space of the insulation crimper is generally constant from a front to a rear of the insulation crimper, wherein a volume of the receiving space of the wire crimper has a generally constant cross section from a front to a rear of the wire crimper, and wherein a volume of the receiving space of the transition crimper generally increases in cross section from a front to a rear of the transition crimper.

12. A terminal crimping machine for crimping a crimp barrel of an electrical terminal to a wire, the terminal crimping machine comprising:

crimp tooling configured to be driven during a crimping operation toward the crimp barrel to terminate the crimp barrel to the wire, the crimp tooling comprising:

an insulation crimper having an insulation crimp profile for crimping an insulation barrel segment of the crimp barrel to insulation of the wire, the insulation crimper includes opposed lead-in sections for forming side walls of the insulation barrel segment and includes crimp radius sections for forming a top of the insulation barrel segment, the lead-in sections being separated by a first width, the crimp radius sections having a first radius of curvature;

a wire crimper having a wire crimp profile for crimping a wire barrel segment of the crimp barrel to a conductor of the wire, the wire crimper includes opposed lead-in sections for forming side walls of the wire barrel segment and includes crimp radius sections for forming a top of the wire barrel segment, the lead-in sections of the wire crimper being separated by a second width narrower than the first width, the crimp radius sections of the wire crimper having a second radius of curvature less than the first radius of curvature; and a transition crimper between the wire crimper and the insulation crimper, the transition crimper having a blended profile segueing without interruption from the wire crimp profile to the insulation crimp profile, the blended profile of the transition crimper transitions between the lead-in sections of the insulation crimper and wire crimper and transitions between the crimp radius sections of the insulation crimper and wire crimper the blended profile for crimping a transition segment of the crimp barrel around the wire that transitions without interruption between the insulation barrel segment and the wire barrel segment.

13. The terminal crimping machine of claim 12, wherein insulation crimp profile, blended profile and wire crimp profile define a continuous crimping profile for the crimp barrel.

14. The terminal crimping machine of claim 12, wherein the blended profile has a smooth transition to the insulation crimp profile and has a smooth transition to the wire crimp profile.

15. The terminal crimping machine of claim 12, wherein the transition crimper includes opposed lead-in sections for forming side walls of the transition segment of the crimp barrel and includes crimp radius sections for forming a top of the transition segment of the crimp barrel, the lead-in sections of the transition crimper transitioning between the lead-in sections of the insulation crimper and wire crimper, the crimp radius sections of the transition crimper transitioning between the crimp radius sections of the insulation crimper and wire crimper.

16. The terminal crimping machine of claim 12, wherein a width between the lead-in sections of the transition crimper constantly changes along the lead-in sections and wherein radii of the crimp radius sections of the transition crimper constantly change along the crimp radius sections.

17. The terminal crimping machine of claim 12, wherein the transition crimper has a front and a rear, the front provided at the wire crimper, the rear provided at the insulation crimper, the lead-in sections of the transition crimper widening from the front to the rear, the radii of the crimp radius sections of the transition crimper increasing from the front to the rear.

18. A terminal crimping machine for crimping a crimp barrel of an electrical terminal to a wire, the terminal crimping machine comprising:

crimp tooling configured to be driven during a crimping operation toward the crimp barrel to terminate the crimp barrel to the wire, the crimp tooling comprising:

an insulation crimper having an insulation crimp profile for crimping an insulation barrel segment of the crimp barrel to insulation of the wire, the insulation crimper having a receiving space bounded by the insulation crimp profile that receives the insulation barrel segment of the crimp barrel;

a wire crimper having a wire crimp profile for crimping a wire barrel segment of the crimp barrel to a conductor of the wire, the wire crimper having a receiving space bounded by the wire crimp profile that receives the wire barrel segment of the crimp barrel; and a transition crimper between the wire crimper and the insulation crimper, the transition crimper having a blended profile segueing from the wire crimp profile to the insulation crimp profile, the blended profile for crimping a transition segment of the crimp barrel around the wire that transitions without interruption between the insulation barrel segment and the wire barrel segment, the transition crimper having a receiving space bounded by the blended profile that receives the transition segment of the crimp barrel.

19. The terminal crimping machine of claim 18, wherein the blended profile has a smooth transition to the insulation crimp profile and has a smooth transition to the wire crimp profile.

20. The terminal crimping machine of claim 18, wherein a volume of the receiving space of the insulation crimper is generally constant from a front to a rear of the insulation crimper, wherein a volume of the receiving space of the wire crimper is generally constant from a front to a rear of the wire crimper, and wherein a volume of the receiving space of the transition crimper generally increases from a front to a rear of the transition crimper.

* * * * *